Dec. 14, 1971 N. R. KILGOUR 3,626,566
METHOD OF FORMING A BALL AND SOCKET JOINT
Filed March 30, 1970 3 Sheets-Sheet 1
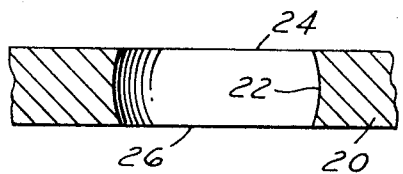
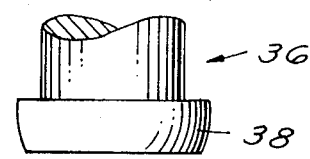
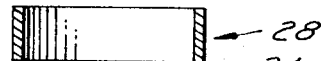
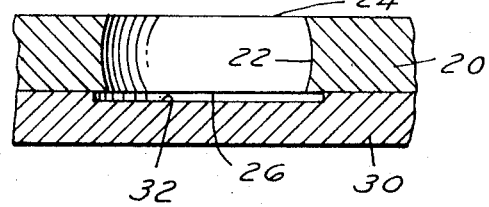
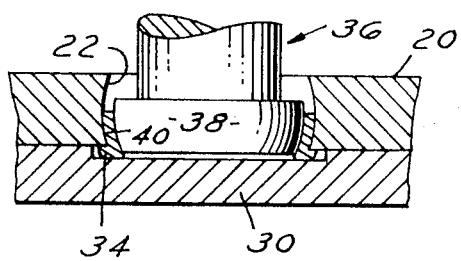
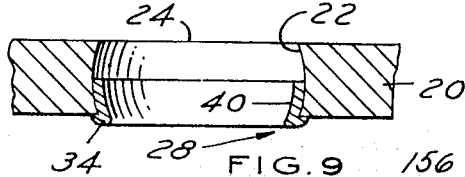
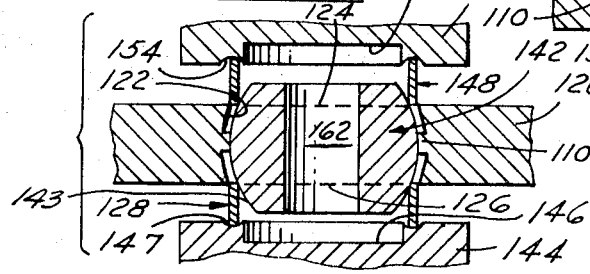
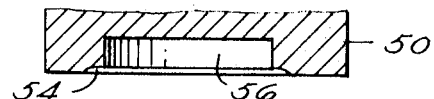
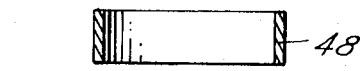
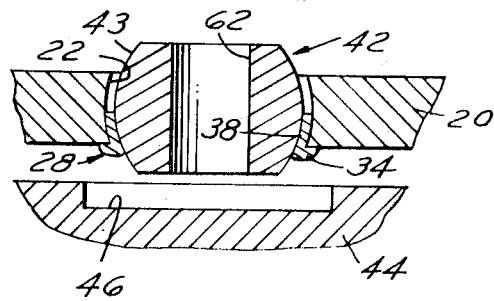
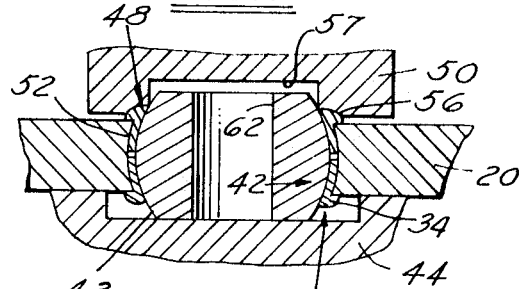
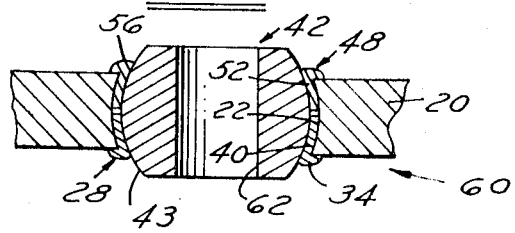
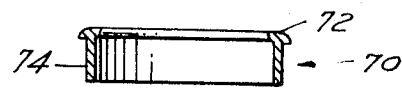
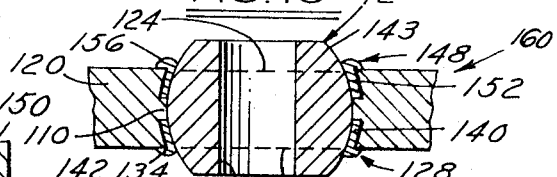
INVENTOR
NORMAN R. KILGOUR
BY
Burton & Parker
ATTORNEYS Dec. 14, 1971   N. R. KILGOUR   3,626,566
METHOD OF FORMING A BALL AND SOCKET JOINT
Filed March 30, 1970   3 Sheets-Sheet 2
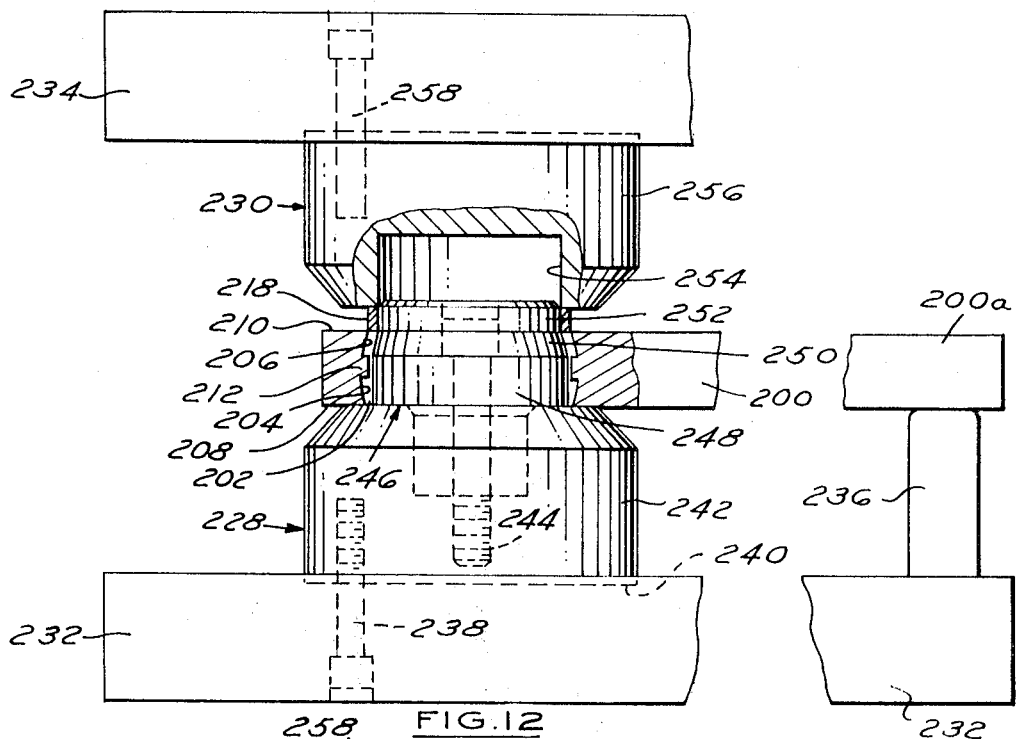
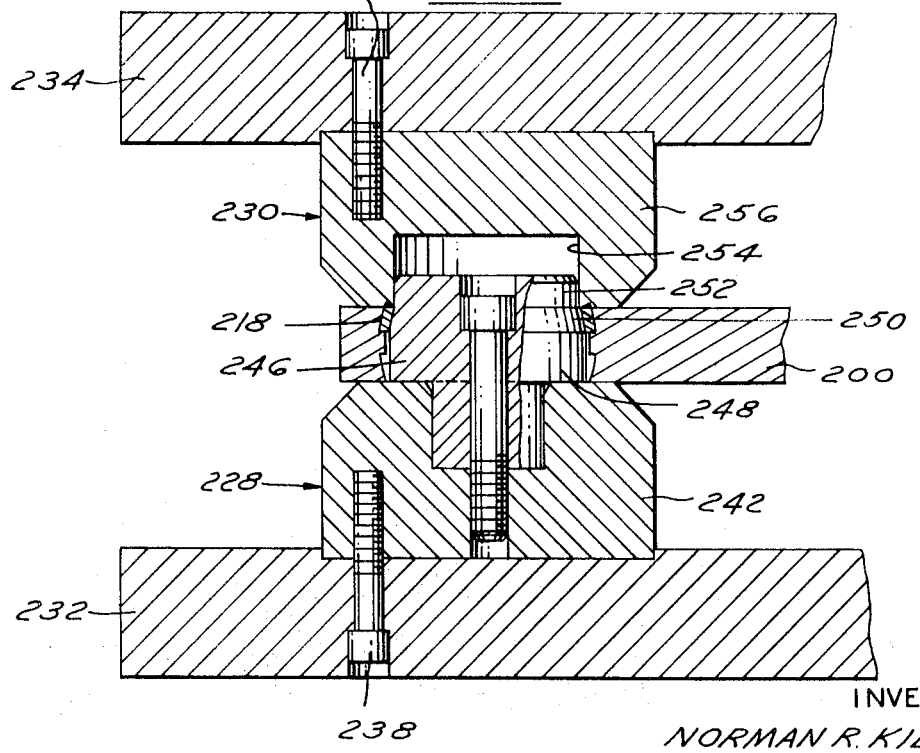
INVENTOR
NORMAN R. KILGOUR
BY
Burton & Parker
ATTORNEYS

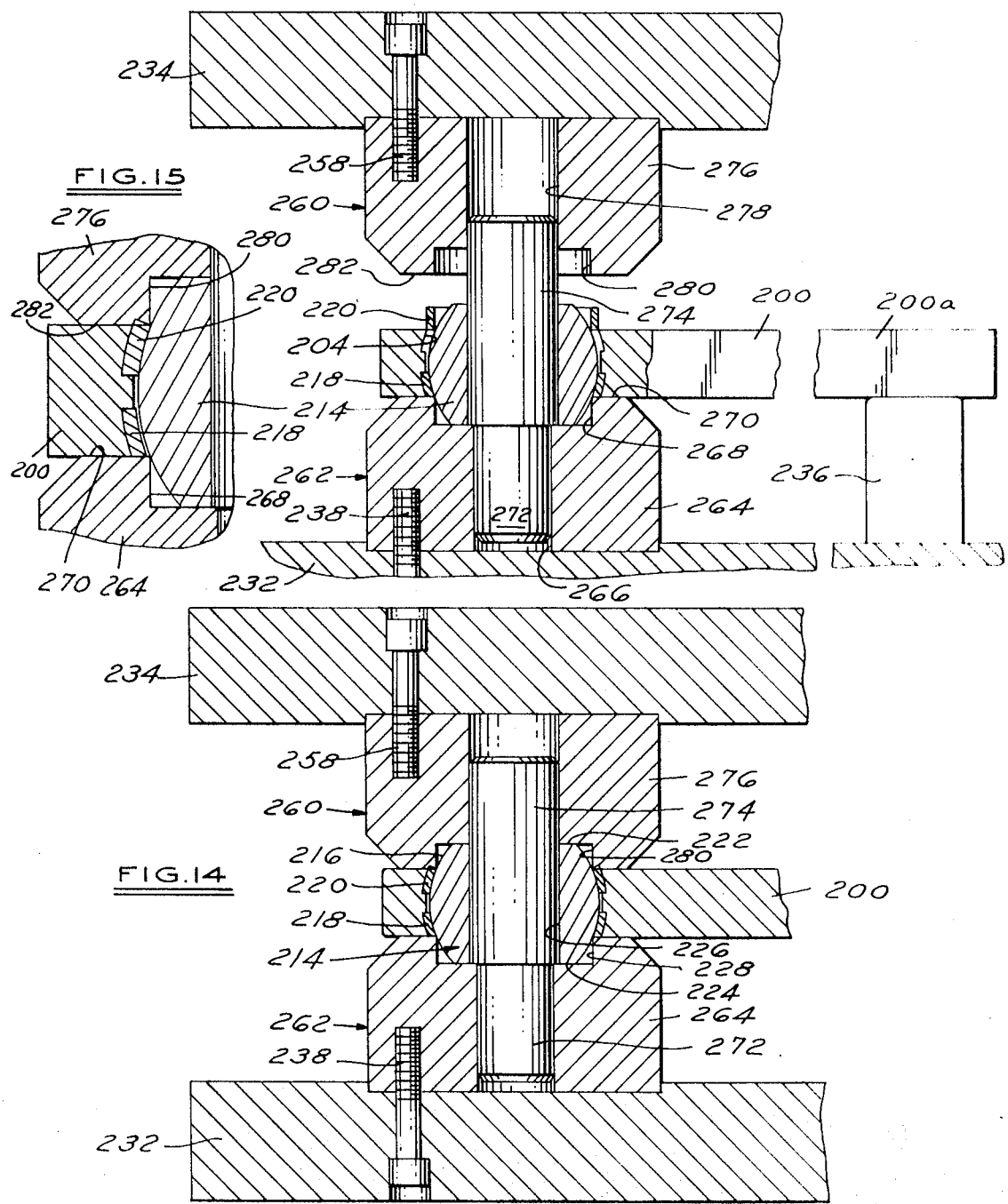

United States Patent Office 3,626,566
Patented Dec. 14, 1971

3,626,566
METHOD OF FORMING A BALL AND SOCKET JOINT
Norman R. Kilgour, Dearborn Heights, Mich., assignor to The Standard Forge Company, Detroit, Mich.
Continuation-in-part of abandoned application Ser. No. 758,516, Sept. 9, 1968. This application Mar. 30, 1970, Ser. No. 23,931
Int. Cl. B23p *11/00*
U.S. Cl. 29—149.5 B                  10 Claims

ABSTRACT OF THE DISCLOSURE

A method of forming a ball and socket joint including forming an aperture in a supporting member having a gradually increasing diameter from each end toward its center, disposing a first bearing member in one end of the aperture having an inner bearing surface conforming to the ball surface, supporting the ball within the aperture spaced a predetermined nominal clearance distance from the first bearing surface, forcing a second bearing member from the opposite end of the aperture between the ball and the aperture wall to provide a second bearing surface conforming to the ball surface, and releasing the ball to permit it to center itself within the bearing surfaces in rotatable relation therewith.

Additional methods of making such a ball and socket joint are disclosed, but the above recited basic method is preferred. The aperture formed in the support may be either spherical or of two frusto-conical sections, and in the preferred form is provided with a central circumferential flange or lip extending radially inwardly of the aperture.

CROSS-REFERENCE TO RELATED APPLICATION

This application is a continuation-in-part of my prior co-pending application Ser. No. 758,516, filed Sept. 9, 1968, now abandoned.

SUMMARY OF THE INVENTION

The method of forming the ball and socket joint of this invention provides a pivotally supported ball member in a solid support suitable for industrial or automotive applications; however the method employed may be utilized for various purposes. The ball and socket joint of this invention is especially suited to applications wherein the ball member is subjected to substantial forces tending to pull the ball from its socket, such as linkage systems for tractor or truck hitches. The drawbar of a tractor, for example, is subject to shock and vibrational forces in the plane of the support, and perpendicular thereto, which will cause failure unless the ball member is securely anchored in the socket. The problem has been to pivotally secure a ball member in a solid support, such as a tractor drawbar, and provide substantially full bearing support for smooth operation, rather than a point contact bearing.

The method of this invention comprises; forming an aperture in the supporting member, preferably open at both ends, disposing a first bearing member in the aperture having a spherical bearing surface adapted for bearing engagement with the ball member received therein, supporting the ball member spaced a predetermined clarance distance from said first bearing surface while forcing an initially cylindrical second bearing member between the spherical surface of the ball member and the surface defining the aperture, from the open end of the aperture opposite the first bearing member. The second bearing member is thereby caused to conform to the configuration of the spherical ball member to provide a spherical bearing surface juxtapositioned to the spherical surface of the first bearing retainer. The ball and socket joint of this invention thus provides a substantially continuous bearing surface, and securely retains the ball member in the support for pivotal motion in the socket.

The ball member has a spherical bearing surface of a diameter slightly less than the inside diameter of the aperture at the open end, to provide close retention while permitting entry of the ball member into the aperture. The second cylindrical bearing member initially has an external diameter substantially equal to the external diameter of the ball member, providing close bearing tolerances, and secure retention of the ball.

In one of the disclosed embodiments of the invention a circumferential flange is formed on the bearing retainers which overlies the open ends of the spherical aperture to retain the bearing retainers and the ball member in position. The radial flange may be formed simultaneously with the deformation of the bearing members in the aperture, or may be formed prior to the deforming operation.

The first bearing member may be formed in a manner similar to the second bearing member by supporting a head member having a spherical surface in the aperture, and forcing the initially cylindrical bearing between the head member and the surface of the aperture. Conversely, the initially cylindrical first bearing member may be positioned within the aperture, and a punch having a spherical head may be forced into the cylindrical member conforming the bearing member to the spherical surface of the punch, which corresponds in configuration to the ball member.

In the first disclosed embodiment of this invention, the aperture or socket in the supporting member is generally spherical, having a maximum diameter perpendicular to the axis of the aperture adjacent the midportion of the aperture. The socket of the second embodiment of the ball and socket joint of this invention may be characterized as generally of double frusto-conical shape. A radial flange or lip extends into the conical aperture, adjacent the midportion thereof, which abuttingly receives the opposed ends of the bearing members.

Other advantages and meritorious features of this invention will more fully appear from the following description of the preferred embodiments, claims and accompanying drawings, wherein:

FIG. 1 is a cross sectional view of the support member of the joint, taken through the axis of a spherical aperture formed therein;

FIGS. 2 and 3 are cross sectional views illustrating one method of forming a first spherical bearing member in the support;

FIG. 4 is a cross sectional view of the spherical first bearing retainer within the support;

FIGS. 5 and 6 are cross sectional views illustrating the method of forming the spherical second bearing member in the support;

FIG. 7 is a cross sectional view of a completed ball and socket joint embodying the invention;

FIG. 8 is a cross sectional view of another embodiment of a bearing member having a preformed flange or lip;

FIG. 9 is a cross sectional view of another embodiment of this invention illustrating the method of assembly;

FIG. 10 is a cross sectional view of the assembled ball and socket joint shown in FIG. 9;

FIG. 11 is a side elevation partly in section of a support having an aperture therethrough and showing upper and lower dies positioned for insertion of a first bearing member into the support aperture;

FIG. 12 is a cross sectional view similar to FIG. 11 showing the first bearing member positioned in the support aperture;

FIGS. 13 and 14 are cross sectional views similar to FIG. 12 showing the dies for inserting a second bearing member in the support aperture and illustrating the steps for inserting such member; and FIG. 15 is an enlarged partial cross-sectional view showing the relationship between the various parts during insertion of the second bearing member.

DESCRIPTION OF THE PREFERRED EMBODIMENTS

The method of forming the ball and socket joint of this invention and disclosed in FIGS. 1 to 6 is particularly suited to forming a swivel joint in a solid supporting socket member 20, wherein access to the socket is limited; however the method disclosed may also be utilized in numerous other applications. The supporting member 20 may be a drawbar for a tractor hitch link, or a portion of any member to be pivotally supported. A spherical aperture or socket 22 is formed in the support of this embodiment, preferably open at opposite ends 24 and 26.

In this embodiment of the invention, an initially cylindrical first bearing retainer is received in an open end 24 of the aperture 22, as shown in FIG. 2. The support 30 may be provided with a groove or aperture 32 adapted to receive the end of the cylindrical bearing insert, and form a radial flange 34 overlying the opening 26 of the socket. The external diameter of the spherical bearing retainer is slightly less than the internal diameter of the opening 24 to permit entry of the insert, but is preferably quite close to the internal diameter to assure close tolerances.

A punch 36 having a spherical head portion 38 is then forced into the cylindrical bearing insert 28, causing the bearing portion 40 to conform to the spherical surface of the socket 22, forming a radial flange or retainer portion 34, as described above and shown in FIGS. 3 and 4. The retainer portion 34 overlies the opening of the socket and securely retains the bearing retainer in position. The bearing portion 40 extends approximately half way into the aperture to permit receipt of the ball member 42, as shown in FIG. 5. The spherical head 38 of the punch may have an external diameter slightly larger than the diameter of the ball member 42 to provide a slight clearance between the ball member and the bearing surface in the final assembly.

The assembly is then supported in a press, or the like, providing a support 44 for the socket member 20 and a counterbore 46 which supportingly receives the ball member 42. An initially cylindrical second bearing retainer 48 is then received over the end of the ball member 42, opposite the first bearing retainer 28, and the ram 50 of the press is applied to force the bearing portion 52 of the second bearing retainer between the spherical surface of the ball member and the spherical surface defining the aperture 22.

It can be seen from FIG. 5 that the external diameter of the cylindrical second bearing retainer is initially approximately equal to the external diameter of the spherical portion 43 of the ball member, and is slightly smaller than the internal diameter of the opening 24 of the aperture to permit entry into the aperture. In this embodiment, the head of the ram 50 is provided with a surface 54 adapted to form a radial flange or retainer portion 56 overlying the opening 24 of the aperture, similar to the retainer portion 34 of the first bearing retainer. A counterbore 57 is also provided in the ram to receive the ball member, which prevents pressure being applied thereto.

The embodiment of the ball and socket joint 60 of this invention formed by the method disclosed in FIGS. 1 to 6 is shown in FIG. 7. The bearing portions 22 and 52 of the bearing retainers each extend approximately half way into the aperture 22 to define a substantially continuous bearing support for the ball member 42. The retainer portions 34 and 56 overlie the opposed openings of the aperture to securely retain the bearing retainers in position, and thereby retain the ball member in the socket. The diameter of the ball member is also considerably greater than the internal diameter of the bearing retainers adjacent the open ends of the aperture, preventing removal of the ball member except by removing one of the bearing retainers. It should also be noted that the method disclosed herein of forming the bearing retainers in the socket will tend to "extrude" the inner end of the bearing portions, resulting in a slightly thinner section adjacent the end of the bearing portion than adjacent the opening to the socket. The thinning of the extruded ends of the bearing retainers has not been shown in the drawings because of the relatively small reduction in thickness; however this feature may be important in designing a ball and socket joint having relatively close tolerances between the ball and bearing members.

The ball member in this embodiment is provided with an aperture 62 adapted to secure the ball member to another structural member, however it will be understood that various ball members may be utilized, including solid ball members, or a ball stud having a shank portion extending out of the socket.

The bearing retainer 70 shown in FIG. 8 has a preformed radial flange 72 which may be utilized in place of either bearing retainer 28 or 48. In this embodiment, the cylindrical bearing portion 74 is formed to the spherical configuration of the aperture as described above, and the final assembly may therefore be substantially identical to the structure shown in FIG. 7.

The ball and socket joint 160 shown in FIG. 10 is quite similar to the joint 60 shown in FIG. 7, except for the configuration of the aperture or socket 122. The socket of this embodiment is generally "conical," and defines a "double cone" having a base adjacent the midportion of the socket, and an altitude or axis generally coaxial with the axis of the aperture. The diameter of the socket thus increases from the open ends 124 and 126 of the aperture, toward the midportion, as does the spherical aperture 22 in FIGS. 1 to 7; and the conical aperture approximates the the spherical aperture 22 described above. The conical aperture is however somewhat simpler to machine than the spherical aperture, and therefore reduces the cost of manufacture.

The support 120 also includes a radial lip 110 at the midportion of the socket which abuttingly receives the opposed ends of the bearing retainers 128 and 148. The radial lip serves as a stop to accurately position the bearings, and prevents shifting of the bearing retainers during forming of the retainer portions 134 and 156. The other details of the ball and socket joint may be similar to the ball and socket joint shown in FIG. 7.

The method of assembly of the ball and socket of FIG. 10 is shown in FIG. 9, and differs from the description relative to FIGS. 1 to 6 in that the bearings 128 and 148 are simultaneously forced between the ball member and the surface of the socket, which socket is conical, rather than spherical, as previously described. The socket may be formed by first forming a cylindrical aperture, as by drilling, and thereafter forming the conical sections 122 with a suitable tool. The inner surface of the radial lip 110 will thus be cylindrical; however because of the relatively small axial length of the lip 110, it will not materially affect the bearing qualities of the joint. The ball member 142 is supported in a press having a support 144 and ram 150. The bearings 128 and 148 are received over the opposed ends of the ball member, as shown, and forced by the press between the conical surfaces of the aperture 122, and the spherical surface 143 of the ball member, into abutting engagement with opposite faces of the radial lip 110. The internal surfaces of the bearing portions are thus extruded to the spherical configuration of the ball head, providing a pair of spherical bearing surfaces and the external surfaces are deformed to the conical surface of the aperture.

The continued pressure of the press, after abutment of the bearing retainers, causes the outer ends of the bearings to deform over the open ends of the aperture, resulting in the retainer portions 134 and 156 similar to the portions 34 and 56 of FIG. 7. The support 144 is provided with an annular groove 147 which forms over the outer end of the first bearing retainer 128 to provide the portion 134, and the ram 150 is provided with an annular groove 154 configured to form the retainer portion 156 on the second bearing retainer 148.

The ball and socket joint shown in FIG. 7 may also be formed by supporting the ball member in the socket 22 and simultaneously forcing both of the bearing retainers into the space between the ball member 42 and the spherical surface defining the aperture 22; similar to the method shown in FIG. 9, or the first bearing retainer may be formed separately by the same method described for the second bearing retainer 48. The ball and socket joint shown in FIG. 7 may also be provided with a radial lip, similar to the radial lip 110 in FIGS. 9 and 10, to prevent misalignment of the bearing retainers.

The elements of the ball and socket joint of this invention may be made from various materials, as required by the particular application for the joint. For example, the bearing retainers may be formed from mild steel, such as 1018 or 1020 steel tubing or stampings, or malleable materials such as bronze. The ball member may be a conventional steel ball, which is generally formed of carburized or hardened steel. The material for the support 20 will also depend upon the application, however a 5150 alloy steel is presently utilized in the commercial tractor linkage systems.

In FIGS. 11–15 inclusive is shown a commercially acceptable method of forming a ball and socket joint according to the present invention, which method is preferred over the methods hereinabove disclosed. While certain parts of the joint shown in FIGS. 11–15 are similar or identical to parts already disclosed, such will be accorded different reference numerals in all cases to avoid confusion.

The ball and socket joint made by the commercially preferred method comprises an elongate support or link 200, which may, for example, be a drag link for a farm tractor, agriculture implement, or the like. Such support 200 is preferably rectangular in cross-section, being of any desired length to suit the particular application, and is commonly made of alloy steel. Adjacent one end of the link there is formed an aperture 202 defining a surface of revolution of circular cross-section transverse to its axis and of gradually increasing diameter from each end thereof toward the center. Such aperture may be spherical in configuration, but the form as shown in FIG. 11, for example, comprises a pair of right circular frusto-conical aperture portions 204 and 206 opening through the opposite support surfaces 108 and 110. Intermediate the conical aperture portions 204 and 206, substantially equidistantly spaced from the surfaces 208 and 210 of the support 200 is a radially inwardly projecting circumferential flange 212 defining a pair of spaced shoulders, the purpose for which will be described herebelow.

In the fully assembled ball and socket joint (see FIG. 14), a ball member 214 having a spherical surface portion 216 is rotatably disposed within the aperture 202, and is supported therein by a pair of bearing elements 218 and 220. The ball member 214 shown herein is provided with flat opposite end surfaces 222 and 224, and has a cylindrical aperture 226 extending therethrough for connection to another structural member. A ball member of such configuration is commonly used in structures of the general type herein illustrated. However, it will be apparent to those skilled in the art that other forms of ball members could be substituted for the specific ball member 214 illustrated in the drawings, as for example a ball stud having a projecting shank integral therewith, and the instant method of making a ball and socket joint could be utilized as well with any such ball member.

As above stated, while the aperture 202 in the support 200 may be spherical, it is illustrated in FIGS. 11–15, and is preferably of, frusto-conical shape at its opposite ends as shown at 204 and 206, which conical portions are separated by a cylindrical flange 212. Such aperture may be formed by drilling or boring a cylindrical aperture completely through the support 200 having a diameter slidably engageable over the ball 214 to provide the inner diameter of the flange portion 212. Thereafter, the frusto-conical wall surfaces 204 and 206 may be machined by a convenient method, as by forming them in a lathe or the like. Each frusto-conical surface is machined in the form of a right circular cone so that the resulting wall surface is spaced equidistantly on opposite sides of the ball 214. In addition, the slope of the walls 204 and 206 is such that the distance between such walls and the spherical surface of the ball 214 when the joint is assembled is greater adjacent the opposite faces 208 and 210 of the support than at the base of the wall portions adjacent the flange 212.

In order to assemble the bearing sleeves 218 and 220 within the support 200 embracing the ball 214, the support 200 is first positioned in between two die assemblies generally indicated at 228 and 230 in FIGS. 11 and 12. The lower die assembly 228 includes a base member 232 while the upper die assembly 230 includes a similar base member 234, the lower base member being relatively stationary and the upper die assembly being vertically shiftable with respect thereto. Adjacent the end thereof opposite the working die portions, the base 232 has a bar 236 welded thereto which serves as a support for the end 200a of the bar 200 opposite the aperture 202. In forming the ball and socket joint in a drag-link or bar of any appreciable length, the end such as shown at 200a is supported to maintain proper alignment of the bar with the die during insertion of the bearing members.

Mounted atop lower base 232 and secured thereto as by a plurality of machine screws, or the like, one of which is shown at 238, is an upstanding supporting die 242, on the flat upper surface of which is positioned the drag-link or support 200 with its aperture 202 already formed therein. Such supporting die 242 is preferably seated in a shallow counterbore 240 in the upper surface of base 232 to provide positive positioning of the die with respect to the mating upper die assembly. Upstanding from the member 242 and secured thereto as by a single screw 244 extending axially therethrough, is the lower die member 246 which includes a lower cylindrical pilot portion 248, an intermediate spherical forming die portion 250, and an upper cylindrical pilot portion 252. As can be seen from FIG. 11, the lower pilot portion 248 is sized to be received within the aperture 202, being slightly undersize the inner diameter of flange 212, and extends upwardly into the link 200 into radially confrontation with the flange 212, serving to locate the die centrally within the aperture.

The intermediate die forming portion 250 is of a spherical outer configuration conforming to the surface of the ball member 214 and serves to conform the bearing sleeve 218 to the proper spherical configuration as such sleeve is forced into place within the link 200. The upper pilot portion 252 initially extends through the bearing 218, properly locating it with respect to the aperture portion 206, and projects therebeyond into a correspondingly shaped recess 254 in upper die member 256, serving as a pilot to insure proper alignment of the upper die with the sleeve 218. The upper die 256 is also secured to its base 234 by a plurality of screws or the like, one of which is shown at 258.

With the parts positioned as shown in FIG. 11, the bearing sleeve or ring member 218 is disposed at the entrance to the aperture portion 206. Such bearing member has an initial outer diameter sized to permit sliding reception of the ring within the aperture. The upper die 230 is then brought down against the ring 218, and force is applied to the die urging the ring 218 into the annular space between the spherical die portion 250 and the aperture wall 206. The ring 218 is forced downwardly until its inner end abuts the radial shoulder of flange 212, and thereafter force is continued on the ring to cause elastic deformation thereof to substantially completely fill the space between the die portion 250 and the wall 206. This results in swelling of the outer end of the ring 218 adjacent the aperture entrance through the link surface 210, as the aperture wall is spaced from the spherical surface a greater distance thereat than adjacent the flange 212. When the ring 218 has been fully engaged within the aperture as shown in FIG. 12, the dies 228 and 230 are separated and the support or link 200 with the bearing sleeve 218 disposed therein is removed from the die.

For the insertion of the remaining bearing sleeve 220, the link or support 200 is inverted and is positioned between another pair of dies 260 and 262, as shown in FIGS. 13 and 14. Each of these dies includes a base member substantially identical to the members described above with respect to FIGS. 11 and 12, and therefore similar parts have been accorded the same reference numerals in FIGS. 13 and 14. In fact, the same base members could be utilized for both operations, although this would require a time consuming disassembly and assembly operation which would be unsuitable to a production line manufacture of the joints.

Referring to FIGS. 13 and 14, a lower die member 264 is secured to the base 232, such member having a central aperture 266 therethrough, and a counterbore 268 opening through its upper face 270. Disposed within the die member 264 is a pilot shaft having a lower cylindrical portion 272 slidably received within the aperture 266, and an upper cylindrical portion 274 resting in the counterbore 268 and slidably received within the ball member 214 which forms a part of the joint. The upper die member 260 is shaped similarly to the lower die member, and is provided with an axial aperture 276 within which the upper shaft portion 274 is received to pilot the die, and a counterbore 278 opening through its lower flat face 282. When the lower die member is assembled as shown in FIG. 13, the link 200 with the bearing member 218 disposed therein is positioned resting on die member 264 against its flat face 270, and the ball member 214 is thereafter slid over shaft portion 274 into contact with the floor of the counterbore 268.

Referring now specifically to FIG. 15, it can be seen that with the link surface 210 in engagement with the upper face 270 of the lower die 264, and the ball 214 resting within the counterbore 268, there is a definite clearance space maintained between the bearing sleeve 218 and the spherical surface of the ball 214. This clearance spacing is maintained during the assembly of the other bearing sleeve 220 within the aperture portion 204 so that upon complete assembly of the joint, the ball 214 may be released to seek its center within the bearings 218 and 220, and there will be slight clearance therebetween to permit relatively free rotation of the ball within the bearing members.

With the parts positioned as in FIG. 13, and the ball maintained spaced a predetermined clearance distance from the surface of bearing ring 218, the upper die 260 is brought down against the bearing ring 220 and such is forced into the space between the spherical ball surface and the aperture wall 204 in identical manner as above described with respect to the bearing sleeve 218. As can be seen from FIG. 14, the counterbore 280 is sized to just clear the ball 214 when the lower die face 282 contacts the upper surface 208 of the link 200 and at the same time maintain mating contact between the face 282 and the end of the bearing sleeve 220 as the latter is forced into the aperture to insure proper positioning of the bearing within the link.

By maintaining the clearance above recited as is shown in FIG. 15, when the bearing portion 220 is completely inserted within the aperture portion 204, the inner surface of the sleeve will be in intimate contact with the spherical surface of the ball member 214, and if such condition were maintained, proper rotation of the ball would be impossible, because the bearing sleeve would bind against the ball surface. However, with the maintenance of the clearance between the bearing sleeve 218 and the ball surface during assembly of the sleeve 220, when the ball and socket assembly is removed from the dies, the ball 214 will seek its center between the two bearing members 218 and 220 and will be freely rotatable in the socket.

What is claimed is:

1. A method of forming a ball and socket joint in a solid supporting member, comprising:
   (a) forming an aperture in the supporting member, open at opposite ends, having a generally circular lateral cross section, and increasing in diameter from the open ends toward the midportion of the aperture.
   (b) disposing a generally cylindrical first bearing retainer having an outer diameter slightly less than the diameter of the aperture at the open end into the support aperture having an axial length equal to approximately one-half the thickness of the support, and conforming the bearing retainer to the inner surface of the support aperture,
   (c) disposing a ball member having a spherical exterior surface into the support opening in bearing relation to said first bearing retainer, and
   (d) disposing a second cylindrical bearing retainer in said spherical aperture from the open end of said aperture opposite said first bearing retainer and forcing the retainer between the spherical surface of said ball head and the opposed surface of the aperture, thereby causing said second bearing retainer to conform to said spherical surface to provide a spherical bearing support for the ball head, and retain said ball head in place.

2. The method of forming a ball and socket joint defined in claim 1 characterized in that a radial flange is formed over each of the open ends of the support aperture when said bearing retainers are caused to conform to the surface of the aperture.

3. The method of forming a ball and socket joint defined in claim 1, characterized in that said first bearing retainer is caused to conform to the surface of the support aperture by disposing the cylindrical bearing retainer in the aperture and forcing a punch having a spherical head into the cylindrical retainer thereby deforming the retainer to the contour of the aperture in the support, and providing a spherical bearing surface on the inner surface of the bearing retainer.

4. That method of making a ball and socket joint including a support and a ball member having a generally spherical surface, comprising:
   (a) forming an aperture through the support with a surface of revolution of circular cross section transverse to its axis and of gradually increasing diameter from each end toward its center,
   (b) disposing a first bearing member within said aperture adjacent one end thereof having an inner bearing surface conforming to said spherical ball member surface;
   (c) positioning said ball member within said aperture supported with its spherical surface spaced a predetermined distance from said inner bearing surface of the first bearing member;
   (d) forcing an initially cylindrical second bearing member over said ball member and between the ball member and the wall of said aperture to cause the member to conform to the space therebetween and provide a spherical bearing surface for said ball member adjacent the bearing surface of said first member; and
   (e) releasing support of said ball member to permit the ball to center itself between the bearing surfaces of said first and second bearing members in rotatable relation thereto.

5. The method of making a ball and socket joint defined in claim 4 characterized by inserting a member having a spherical surface within said aperture supported in predetermined spaced relation with the wall of said aperture in the support and forcing said first bearing member over said spherical member and between such member and said aperture wall to cause said first bearing member to conform to the space therebetween and provide a spherical inner bearing surface conforming to said spherical ball member surface.

6. The method of making a ball and socket joint defined in claim 5 characterized by forming said aperture through the support with a central, radially inwardly projecting circumferential flange having an inner diameter closely embracing the spherical surface of said ball member upon insertion of said ball member within the aperture, and forcing the inner ends of said first and second bearing members into abutting engagement with the opposite radial surfaces of said flange.

7. The method of making a ball and socket joint defined in claim 6 characterized by forming said aperture through the support as a pair of right circular frusto-conical surfaces each having its major diameter at said flange and its minor diameter at the aperture opening through the support and with the distance between the spherical ball surface and said aperture wall being greater at said aperture openings through opposite sides of the support than adjacent opposite radial surfaces of said flange.

8. The method of making a ball and socket joint defined in claim 7 characterized by successively forcing said first bearing member and said second bearing member into abutting engagement with said opposite radial surfacess of said flange and continuing such force beyond the elastic limit of the bearing members to cause each bearing member to swell at the outer end thereof adjacent the aperture opening through the support and substantially fill the space between the aperture wall and the spherical surface of the ball member adjacent said aperture opening.

9. That method of making a ball and socket joint including a support and a ball member having a spherical surface, comprising:
 (a) forming an aperture extending transversely through said support defining a pair of right circular frusto-conical aperture portions each opening through an opposite support surface and spaced apart at their adjacent inner ends by a radially inwardly extending circumferential flange having an inner diameter adapted closely embrace said spherical ball surface with the major diameter of such aperture portions located at opposite sides of said flange respectively;
 (b) positioning a bearing forming head having a spherical surface corresponding to said ball member surface in said aperture spaced radially opposite one of said frusto-conical aperture portions;
 (c) forcing a first initially cylindrical ring-like bearing member over said head and between said head and the wall of said one aperture portion into abutment with one radial surface of said flange and causing deformation of such member to fill the space between the head and the aperture wall and provide a first bearing surface;
 (d) removing said bearing forming head from said aperture;
 (e) positioning said ball member within said aperture and supporting the same with the spherical surface thereof spaced a predetermined clearance dimension from said first bearing surface;
 (f) forcing a second initially cylindrical ring-like bearing member over said ball member and between said ball member and the wall of the opposite aperture portion into abutment with the opposite radial surface of said flange and causing deformation of such member to fill the space between the ball member and the aperture wall and provide a second bearing surface; and
 (g) releasing support from said ball member and permitting the same to center itself between said first and second bearing surfaces in rotatable relation therebetween.

10. The method of making a ball and socket joint defined in claim 9 characterized by forming said pair of right circular frusto-conical aperture portions each with the distance from the aperture wall to the spherical surface of said ball member being greater at the aperture oepning through the support than at the inner end thereof adjacent said circumferential flange, and forcing said first and second bearing members respectively into said aperture portions abutting said radially extending surfaces of said flange and continuing said force to cause swelling of each bearing member between the respective aperture wall and opposed spherical surface adjacent the respective aperture opening through the support.

References Cited
UNITED STATES PATENTS

| | | | |
|---|---|---|---|
| 2,366,688 | 1/1945 | Heim | 29—149.5 B |
| 2,541,160 | 2/1951 | Heim | 29—149.5 B |
| 2,665,956 | 1/1954 | Heim | 29—149.5 B |
| 2,701,907 | 2/1955 | Heim | 29—149.5 B |
| 2,759,244 | 8/1956 | Heim | 29—149.5 B |

THOMAS H. EAGER, Primary Examiner

U.S. Cl. X.R.

29—441